(12) United States Patent
Ozgul

(10) Patent No.: US 9,535,887 B2
(45) Date of Patent: Jan. 3, 2017

(54) CREATION OF A CONTENT DISPLAY AREA ON A WEB PAGE

(71) Applicant: Google Inc., Mountain View, CA (US)

(72) Inventor: Mehmet Baran Ozgul, Kent (GB)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/777,655

(22) Filed: Feb. 26, 2013

(65) Prior Publication Data

US 2014/0245125 A1 Aug. 28, 2014

(51) Int. Cl.
*G06F 17/21* (2006.01)
*G06F 17/22* (2006.01)
*G06F 17/30* (2006.01)

(52) U.S. Cl.
CPC ......... *G06F 17/2247* (2013.01); *G06F 17/212* (2013.01); *G06F 17/30867* (2013.01)

(58) Field of Classification Search
CPC .............................. G06F 17/24; G06F 17/2247
USPC ........................................................ 715/234
See application file for complete search history.

(56) References Cited

U.S. PATENT DOCUMENTS

| | | | |
|---|---|---|---|
| 6,922,200 B1 * | 7/2005 | Marques ........... | G06F 17/30905 345/619 |
| 7,543,005 B1 * | 6/2009 | Edelman ............. | G06F 17/3089 |
| 2002/0023111 A1 * | 2/2002 | Arora et al. ................... | 707/513 |
| 2005/0071783 A1 * | 3/2005 | Atkins ........................... | 715/851 |
| 2008/0059312 A1 | 3/2008 | Gern et al. | |
| 2008/0109472 A1 * | 5/2008 | Underwood et al. ......... | 707/102 |
| 2009/0049406 A1 * | 2/2009 | Epstein ................. | G06F 17/217 715/810 |
| 2010/0023855 A1 | 1/2010 | Hedbor et al. | |
| 2010/0036740 A1 | 2/2010 | Barashi | |
| 2010/0122192 A1 * | 5/2010 | Hanna ........................... | 715/765 |
| 2011/0065082 A1 | 3/2011 | Gal et al. | |
| 2011/0167336 A1 | 7/2011 | Aitken et al. | |
| 2011/0307825 A1 * | 12/2011 | Gorodyansky et al. ...... | 715/781 |
| 2012/0173626 A1 | 7/2012 | Reis et al. | |

(Continued)

OTHER PUBLICATIONS

Eric A. Meyer, Smashing CSS: Professional Techniques for Modern Layout, 2010, John Wiley & Sons, p. 221, 248.*

(Continued)

*Primary Examiner* — Frank D Mills
(74) *Attorney, Agent, or Firm* — Foley & Lardner LLP; John D. Lanza

(57) ABSTRACT

A computerized method of generating a content display area on a web page is provided. The method includes receiving a request to initiate a content display area creation sequence for a web page loaded at a web browser. The method includes receiving position data of objects comprising the web page. The method includes determining eligible positions for the content display area. The method includes receiving a first user input indicating a position of a space for the content display area. The method includes repositioning the space and the objects responsive to the first user input. The web browser loads the space and the repositioned objects for viewing. The method includes receiving a second user input indicating confirmation of the position of the space. The method includes generating machine-readable instructions for providing the content display area on the web page. The method includes providing display data representative of the machine-readable instructions.

20 Claims, 15 Drawing Sheets

(56) References Cited

U.S. PATENT DOCUMENTS

2012/0210208 A1    8/2012  Underhill et al.
2013/0036351 A1    2/2013  King et al.
2014/0208199 A1*   7/2014  Peleg ................. G06Q 30/0277
                                                                715/234

OTHER PUBLICATIONS

Steve Johnson, Adobe Dreamweaver CS6 on Demand, Second Edition, 2012, published by Que, pages titled Inserting Form Objects, Creating AP Elements, Previewing Pages in a Browser, Modifying Text Fields and Text Areas, Working with Tables, Using Code View, Applying Text Styles, Setting CSS Properties, Setting AP Element Preferences, Working with Color.*
Bottoni, Paolo, Roberta Civica, Stefano Levialdi, Laura Orso, Emanuele Panizzi, and Rosa Trinchese. "MADCOW: a multimedia digital annotation system." In Proceedings of the working conference on Advanced visual interfaces, pp. 55-62. ACM, 2004.*
International Search Report & Written Opinion on PCT/US2013/074272 dated Mar. 17, 2014.
Microsoft Sharepoint Designer 2007—Create a region type, printed Jan. 18, 2013, 8 pages.

* cited by examiner

FIG. 4E

CREATION OF A CONTENT DISPLAY AREA ON A WEB PAGE

BACKGROUND

The present disclosure relates generally to creating one or more elements for display on a web page. More particularly, the present disclosure relates to visually designating a content display area on a web page while the web page is loaded at a web browser.

Publishers consider the size, color scheme, positioning, and other style attributes of the elements on a web page to create visually appealing web pages. Some publishers designate a space on a web page to which a third party responsible for content serves a variety of content. The attributes of that space are part of making the web page visually appealing.

SUMMARY

One implementation of the disclosure relates to a computerized method of generating a content display area on a web page. The method includes receiving a request to initiate a content display area creation sequence for a web page loaded at a web browser for viewing. The method includes receiving position data of a plurality of objects comprising the web page. The method includes determining a plurality of eligible positions for the content display area on the web page based on the position data of the plurality of objects. The method includes receiving a first user input indicating a position of a space on the web page for the content display area. The position of the space comprises one of the plurality of eligible positions for the content display area. The method includes repositioning the space and the plurality of objects responsive to the first user input. The web browser loads the space and the repositioned objects for viewing. The method includes receiving a second user input indicating confirmation of the position of the space on the web page. The method includes generating machine-readable instructions for providing the content display area on the web page based on the confirmed position of the space. The method includes providing display data representative of the machine-readable instructions.

Another implementation of the disclosure relates to system for generating a content display area on a web page. The system includes a processing circuit. The processing circuit is configured to receive a request to initiate a content display area creation sequence for a web page loaded at a web browser for viewing. The processing circuit is configured to receive position data of a plurality of objects comprising the web page. The processing circuit is configured to determine a plurality of eligible positions for the content display area on the web page based on the position data of the plurality of objects. The processing circuit is configured to receive a first user input indicating a position of a space on the web page for the content display area. The position of the space comprises one of the plurality of eligible positions for the content display area. The processing circuit is configured to reposition the space and the plurality of objects responsive to the first user input. The web browser loading the space and the repositioned objects for viewing. The processing circuit is configured to receive a second user input indicating confirmation of the position of the space on the web page. The processing circuit is configured to generate machine-readable instructions for providing the content display area on the web page based on the confirmed position of the space. The processing circuit is configured to provide display data representative of the machine-readable instructions.

Another implementation of the disclosure relates to a tangible computer-readable storage medium having instructions stored thereon that, when executed by a computing device, cause the computing device to perform certain operations. The operations include receiving a request to initiate a content display area creation sequence for a web page loaded at a web browser for viewing. The operations include receiving position data of a plurality of objects comprising the web page. The operations include determining a plurality of eligible positions for the content display area on the web page based on the position data of the plurality of objects. The operations include receiving a first user input indicating a position of a space on the web page for the content display area. The position of the space comprises one of the plurality of eligible positions for the content display area. The operations include repositioning the space and the plurality of objects responsive to the first user input. The web browser loads the space and the repositioned objects for viewing. The operations include receiving a second user input indicating confirmation of the position of the space on the web page. The operations include generating machine-readable instructions for providing the content display area on the web page based on the confirmed position of the space. The operations include providing display data representative of the machine-readable instructions.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 4A-4I are display images viewable by a user on a display device during creation of a content display area, according to illustrative implementations.

DETAILED DESCRIPTION

Figure 1:
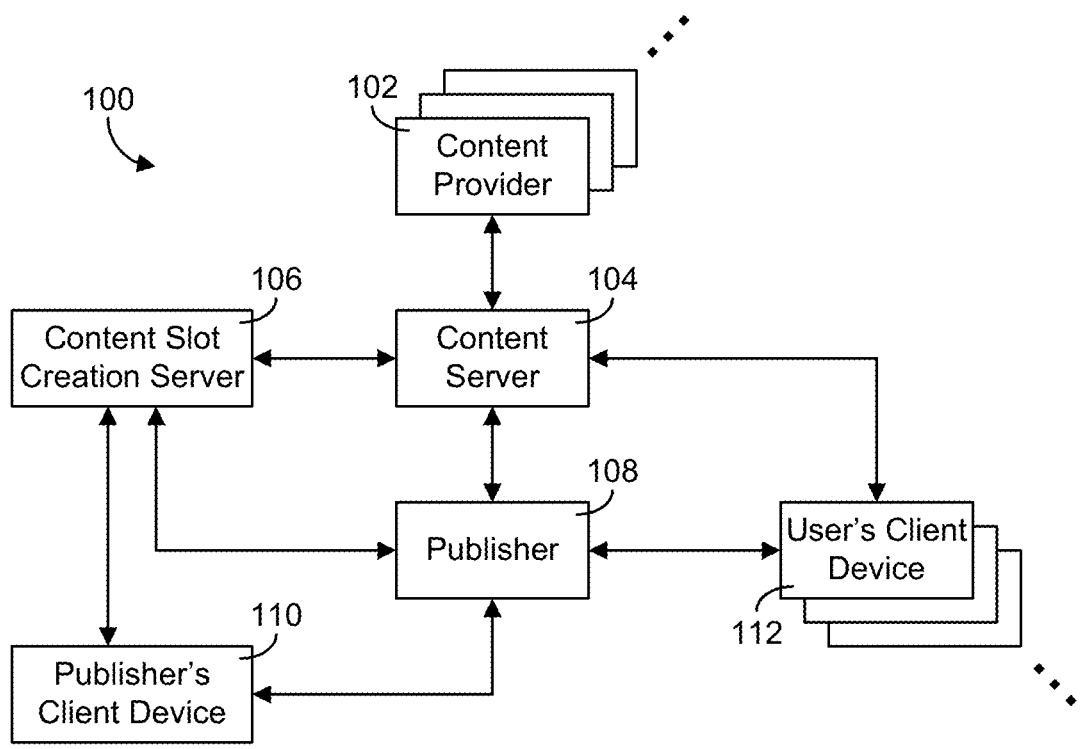
FIG. 1 is a block diagram of a computer system for generating a content display area on a web page, according to an illustrative implementation.

Content publishers may provide first content, such as a web site, along with second content, such as advertisements, to users at, e.g., client computing devices. According to an illustrative implementation, content publishers are entities that operate web sites. The publisher's web site may be a collection of web pages where the online content that belongs to the publisher is displayed. A publisher may be an individual blogger, an online news agency, a company selling products online, etc. Publishers may generate an income by publishing first content and/or second content on the web site they own. Content providers may provide second content. According to an illustrative implementation, the content provider is an advertiser that wants advertisements to be displayed on the publisher's web site.

A content publisher may designate space on the content publisher's web site at which to display second content. This space may be referred to in the discussion herein as a "content slot" or "content display area." A variety of content (e.g., text, static graphics, animated graphics, full motion video, rich media, etc.) may be provided to the content slot. The content slot and/or the content provided to the content slot may have varying display sizes (e.g., on a web site), file sizes (e.g., as stored in a memory and/or transmitted to a client computing device), data formats (e.g., Flash, HTML5, etc.). In some implementations, the content may be interactive. For example, content may solicit user responses or may include a game involving user control through one or more user input devices associated with a client computing device (e.g., mouse, keyboard, etc.). According to an illustrative implementation, the content served to the content slot is an online advertisement (e.g., advertisements for display on a web page). In other implementations, content may be information (e.g., news), games, or other types of content. The content slot may be loaded on a user's client device (e.g., on a web browser) based on, e.g., a portion of JavaScript code or tag that is part of the web site's source code. When computing devices access the first content (e.g., an individual visits a web site), the devices may also access the second content.

Creating a JavaScript tag that generates a content slot that is aesthetically consistent (i.e., the right look and feel) with a publisher's web page can be challenging. JavaScript is mentioned as an example. The code that generates the content slot may be any machine-readable code from any suitable computer-programming language (referred to herein as "content code"). In the discussion herein, a "publisher's agent" is a user responsible for managing the publisher's web site and, in particular, generating content display areas and/or the content code for the content display areas. The content code may specify one or more style attributes of the content slot, including dimensions (height, width, etc.) and color palette (e.g., title color, text color, URL color, etc.).

In some implementations, the publisher's agent generates content code by visiting a web application configured to generate content code. The agent specifies one or more attributes (e.g., dimensions, color palette, etc.) of the content display area. The web application generates the content code. The agent may then copy and paste the content code into the source code of the publisher's web site. When a user loads the publisher's web site on a client device, the web site along with the content display area may be loaded by a web browser. If the attributes of the content display area are not correct (e.g., not visually appealing), the agent may repeat the process, specifying other attributes.

The present disclosure describes methods, systems, and tangible computer-readable storage media for a content slot creation server configured to enable a publisher to create a content display area at the publisher's web page. Among other features, the publisher and/or the publisher's agent may be able (1) initiate a content display area creation sequence at the publisher's web page; (2) move a cursor over to a position on the web page where they would like the content display area to appear; (3) automatically view a content display area place holder in the position, with the web browser updating and/or reloading the web page with the place holder; (4) receive recommended attributes for the content display area (e.g., dimensions, color, etc.); and (5) complete the content display creation sequence using, e.g., a pop-up window; and (6) receive content code, which may be copied and pasted into the source code for the web site.

One or more implementations of the present disclosure may advantageously enable a publisher to generate a content display area that matches or comports with the layout, dimensions, and color palette of their web site in an assisted or automated manner. One or more implementations may advantageously enable a publisher to create a new content display area directly inside their content web site. One or more implementations may advantageously enable a publisher to select and/or adjust the dimensions of the content display area automatically according to the whitespace/ location on the web page identified by the publisher. One or more implementations may advantageously enable a publisher to select and/or adjust the color palette automatically by analyzing the colors already used on the publisher's web page. One or more implementations may advantageously enable a publisher to complete other setup steps to create the content code for the content display area.

One or more implementations of the present disclosure may advantageously allow a publisher to customize their site's layout while having the context of their web site during content display area creation. This may advantageously avoid a series of iterations until content code with the correct (e.g., visually appealing) dimensions and color palette of the content display area is created.

Referring to FIG. 1, a block diagram of a computer system 100 for generating a content display area on a web page is shown, according to an illustrative implementation. The blocks of FIG. 1 may represent one or more computing systems. The computing systems may communicate via a network. The network may be any form of computer network that relays information between content providers 102, content server 105, content slot creation server 106, publisher 108, publisher's client device 110, and/or users' client devices 112. For example, the network may include the Internet and/or other types of data networks, such as a local area network (LAN), a wide area network (WAN), a cellular network, a satellite network, or other types of data networks. The network may include any number of computing devices (e.g., computers, servers, routers, network switches, etc.) that are configured to receive and/or transmit data within the network. The network may include any number of hardwired and/or wireless connections. For example, client devices 110, 112 may communicate wirelessly (e.g., via WiFi, cellular, radio, etc.) with a transceiver that is hardwired (e.g., via a fiber optic cable, a CAT5 cable, etc.) to other computing devices in the network.

System 100 includes client devices 110, 112. Publisher's client device 110 refers to one or more computing devices used by a publisher's agent to manage the publisher's web site. User's client devices 112 refer to one or more computing devices used by the a public user to access the publisher's web site and view the content provided at the content display area. According to an illustrative implementation, devices 110, 112 may represent one or more client computing devices. A client computing device may be any number of different user electronic devices configured to communicate via a network (e.g., a laptop computer, a desktop computer, a tablet computer, a smartphone, a digital video recorder, a set-top box for a television, a video game console, etc.). Devices 110, 112 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of devices 110, 112 (e.g., a built-in display, microphone, etc.) or external to the housing of devices 110, 112 (e.g., a monitor connected to device 112, a speaker connected to device 112, etc.), according to various implementations. For example, devices 110, 112 may include an electronic display, which visually displays web pages and/or advertisements using data received from content publisher 108 and/or content server 104.

System 100 includes one or more content providers 102. Content provider 102 may represent one or more computing systems associated with entities with content they wish to have displayed on a content publisher's publication. The type of the content requested to be provided may include text, static graphics, animation, full motion video, rich media, etc. The size of the content requested to be provided may vary, including, e.g., 336 pixel×280 pixel (large rectangle), 300 pixel×250 pixel (medium rectangle), 728 pixel× 90 pixel (leaderboard), 160 pixel×600 pixel (wide skyscraper), etc.

System 100 includes content publisher 108. Content publisher 108 may include one or more electronic devices connected to a network. For example, content publisher 108 may include computer servers (e.g., FTP servers, file sharing servers, web servers, etc.) or other devices that include a processing circuit. According to an illustrative implementation, content publisher 108 may serve content (e.g., a web site) to client device 108 based on a request received from client device 108 (e.g., a user accessing a web site on a web browser). Content publisher 108 may provide media content to devices 112. Media content may include, but is not limited to, web page data, a movie, a sound file, pictures, and other forms of data.

System 100 includes content server 104. Content server 104 may store and/or provide digital advertisements to devices 112 via a network. Content publisher 104 may provide a web page to device 112, in response to receiving a request for a web page from device 112. In some implementations, an advertisement from content server 104 may be provided to device 112 indirectly. For example, content publisher 108 may receive advertisement data from content server 104 and use the advertisement as part of the web page data provided to device 112. In other implementations, an advertisement from content server 104 may be provided to device 112 directly. For example, content publisher 112 may provide web page data to device 112 that includes a command to retrieve an advertisement from content server 104. On receipt of the web page data, device 112 may retrieve an advertisement from content server 104 based on the command and display the advertisement when the web page is rendered on a display associated with device 112. Content from content server 104 may include text, static graphics, animated graphics, full motion video, rich media, etc. Content server 104 may include several computing devices (e.g., a data center, a network of servers, etc.). Content server 106 may deliver content to one or more web sites (e.g., content publisher 108's web site and other web sites). In some implementations, content server 104 may be unique to a particular content publisher and/or content organizer. In such implementations, content server 104 may serve content only to that content publisher and/or content publishers associated with the content organizer. Content server 106 may store statistics, metrics, reports, and/or other processed and unprocessed data regarding delivery of content to devices 112. Content server 106 may transmit such data to content slot creation server 106, publisher 108, and/or a budget server (not shown). Budget server may be one or more computing devices configured to receive, store, and/or retrieve financial data associated with delivery of content via content display areas on or more of the publisher's web sites.

System 100 includes content slot creation server 106. Server 106 is described in more detail in the discussion of FIG. 2. Server 106 may be configured to receive a request to initiate a content display creation sequence for a web page loaded at a web browser for viewing. The request may be received from, e.g., publisher's client device 110. The utility may allow content slot creation server 106 to access one or more documents relating to a web page (e.g., the DOM document, CCS file, etc.). The request may be received via, e.g., a software utility installed on the web browser of device 110. For example, the utility may be a web browser toolbar extension. The toolbar extension may appear as a selectable icon on the web browser of device 110 (e.g., icon 406 of FIG. 4A). The utility may be used by the publisher and/or publisher's agent for one or more tasks associated with managing the content display areas of a web page and/or the content provided in the content display areas. For example, the utility may include a graphical user interface (GUI) elements for providing reports and/or statistics regarding revenue generated based on the content served to users' client devices 112. Thus, the utility may retrieve data from, e.g., content server 104, a budget server (not shown), and/or other computing devices relating to the delivery of second content. The utility may also access content slot creation server 106, publisher 108, publisher's client device 1120, content server 104, etc., to implement one or more of the processes described herein. In some implementations, a utility dedicated to the content display creation process is provided. In other implementations, a utility configured to provide multiple processes is provided. In some implementations, the utility may be served by content slot creation server 106 to client device 110. Publisher's client device 110 may refer to any of one or more computing devices with the utility configured to communicate with content slot creation server 106 installed.

Server 106 may be configured to access and/or parse the HTML document object model (DOM) to identify suitable areas where a content slot can be inserted in the publisher's page. Server 106 may be configured to insert content slot place holders into the DOM document. The web browser at which the agent is accessing the web site may automatically update to include the place holders in response to server 106 modifying the DOM document. In some implementations, the place holders are not visible to the agent initially. In other implementations, the place holders are visible. The machine-readable code for the place holders may include code for a place holder to dynamically grow in size when the publisher's agent moves a cursor over the place holder. The machine-readable code may also include code for a place holder to disappear when the agent's cursor is over another place holder. Server 106 may be configured to calculate suitable dimensions for each of the identified areas (i.e., the potential content display areas). Server 106 may be configured to generate machine-readable code based on a content display area selected by the agent and provide the generated code to the agent via GUI elements.

In some implementations, content slot creation server 106, content server 104, budget server (not shown), and/or other servers may be associated with a content organizer. A content organizer may be an entity that stores second content, coordinates delivery of second content, maintains statistics of second content delivery, generates metrics associated with second content delivery, etc. A content organizer may coordinate content delivery for multiple publishers.

Figure 2:
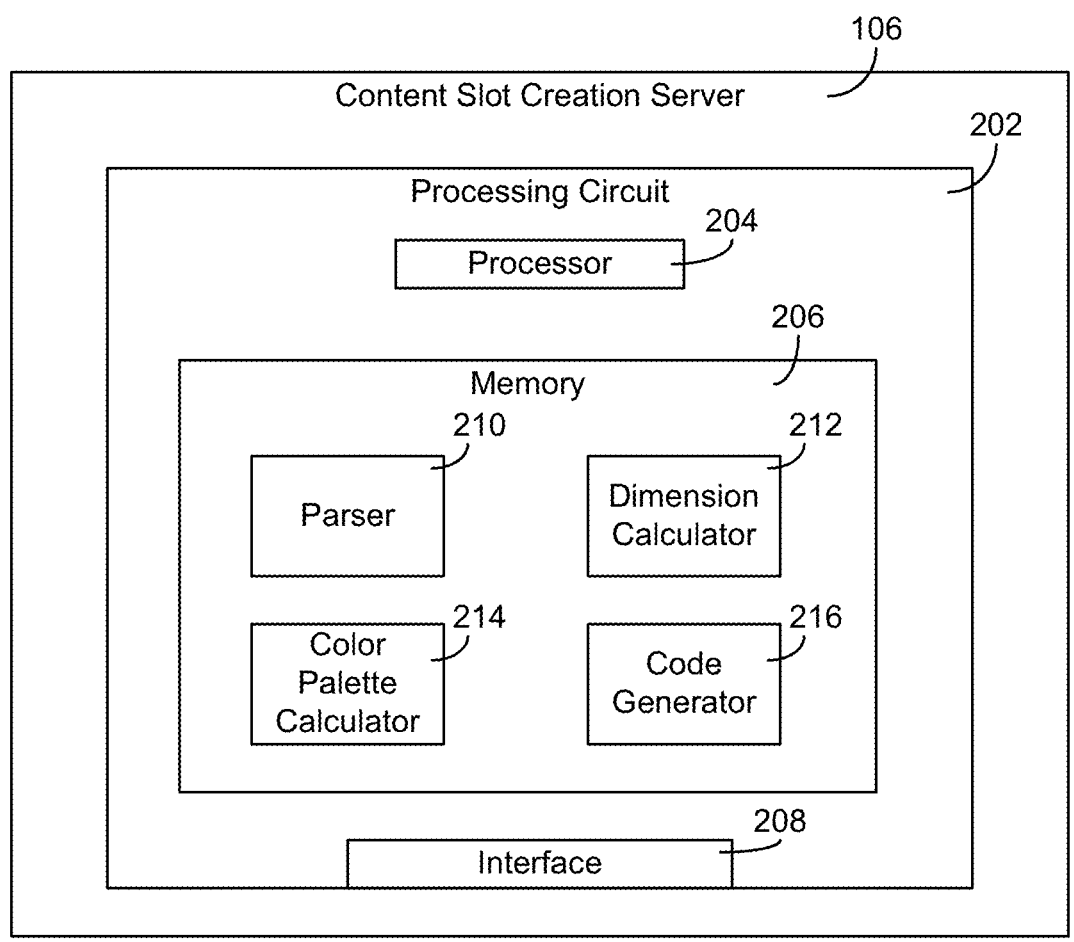
FIG. 2 is a block diagram of content slot creation server of FIG. 1, according to an illustrative implementation.

Referring to FIG. 2, a block diagram of content slot creation server 106 of FIG. 1, according to an illustrative implementation. Scheduling server 110 may be configured to carry out the processes described FIGS. 3A-3F and/or other processes described herein. In some implementations, content slot creation server 106 may one or more computing devices that are distinct from other devices connected to the network. In other implementations, server 106 be part of other computing devices (e.g., content server 104). In other implementations, some elements of server 106 are in the processing circuit(s) of server 106, while other elements are in the processing circuit(s) of other computing devices.

Content slot creation server 106 includes processing circuit 202, including, e.g., a processor 204 and a memory 206. Processor 204 may include a microprocessor, application-specific integrated circuit (ASICS), field-programmable gate array (FPGA), etc., or combinations thereof. Processor 204 may receive position data for a plurality of objects comprising the web page. Processor 204 may utilize one or more heuristics to determine a plurality of eligible positions for content display areas on the web page. Processor 204 may reposition a space for a content display area and the plurality of objects on the web page in response to a user input. Processor 204 may transmit commands to publisher's client device 110 to reload the web page such that the publisher's agent may view the modified web page in real time, or nearly real time. Processor 204 may generate machine-readable instructions for providing the content display area on the web page based on a confirmed position of the space and provide display data representative of the machine-readable instructions to publisher's client device 110.

Content slot creation server 106 includes memory 206. Memory 206 may store machine instructions that, when executed by processor 204, cause processor 204 to perform one or more of the operations described herein. Memory 206 may include, but is not limited to, electronic, optical, magnetic, or any other storage or transmission device capable of providing processor 204 with program instructions. Memory 206 may include a floppy disk, CD-ROM, DVD, magnetic disk, memory chip, ASIC, FPGA, read-only memory (ROM), random-access memory (RAM), electrically-erasable programmable ROM (EEPROM), erasable-programmable ROM (EPROM), flash memory, optical media, or any other suitable memory from which processor 204 can read instructions. The instructions may include code from any suitable computer-programming language such as, but not limited to, C, C++, C#, Java, JavaScript, Perl, Python, and Visual Basic. Memory 206 may store data related to dimensions for content display areas, color palette, and/or content to be displayed, including the type and substance of content items requested to be displayed. In some implementations, data stored on memory 206 may be split across multiple devices.

Content slot creation server 106 includes communications interface 208. Communications interface 208 may be a network interface, and processing circuit 202 may be configured to communicate with one or more components of system 100 (FIG. 1) via a network connection provided by communications interface 208. For example, a request to initiate a content display area creation sequence may be received from publisher's client device 110 at content slot creation server 106 via communications interface 208. For example, a modified DOM document with content display area place holders may be transmitted from content slot creation server 106 to publisher 108 and/or publisher's client device 110 via communications interface 208. Communications interface 208 can be or include wired or wireless interfaces (e.g., jacks, antennas, transmitters, receivers, transceivers, wire terminals, etc.) for conducting data communications with another system or network. For example, communications interface 202 can include an Ethernet card and port for sending and receiving data via an Ethernet-based communications network. In another example, communications interface 202 includes a WiFi transceiver for communicating via a wireless communications network. Communications interface 208 may be configured to communicate via local area networks or wide area networks (e.g., the Internet, etc.).

Memory 206 includes one or more logic blocks or modules of computer code that are implemented by processor 204 and/or processing circuit 202 to implement the processes described herein. Parser 210 may be configured to access and process one or more documents relating to the web page. For example, parser 210 may parse the DOM document to identify spaces on a web page that are eligible to be content display areas. For example, parser 210 may parse the Cascading Style Sheets (CSS) file for the web page to identify a global body text color specified in the CSS file. Dimension calculator 212 may be configured to process data received from the DOM document, CSS file, and/or other document relating to the web page and calculate recommended dimensions for one or more potential content display areas on the web page. For example, dimension calculator 212 may calculate a maximum width of a block element of the web page and compare the maximum width to a plurality of pre-determined widths for content display areas to determine a recommended width. Color palette calculator 214 may be configured to process data received from DOM document, CSS file, and/or other document relating to the web page and determine one or more colors for use in the content display area. For example, to determine the color of the content text, color palette calculator 214 may determine whether one color has been used more than others for text on the web page. Code generator 215 may be configured to process data received from the DOM document, CSS file, and/or other document relating to the web page, and user inputs (e.g., confirming the position of content display area), to generate machine-readable code representing the confirmed content display area. Code generator 215 may be configured to generate machine-readable code in one or more computer languages (e.g., HTML, JavaScript, etc.) and provide display data to a display of the publisher's client device 110 representative of the generated code. The publisher's agent may then, e.g., copy and paste the generated code into the source code of the web page, resulting in the web page having a content display area with the attributes (e.g., dimensions, color palette, etc.) determined during the content display area creation sequence. Code generator 216 may also be configured to modify the DOM document of a web page (e.g., by inserting content display area place holders) and/or provide commands to a web browser of publisher's client device 110 to reload a web page with the modified DOM document. Other functions or more-detailed versions of the functions mentioned are described in more detail herein.

Figure 3A:
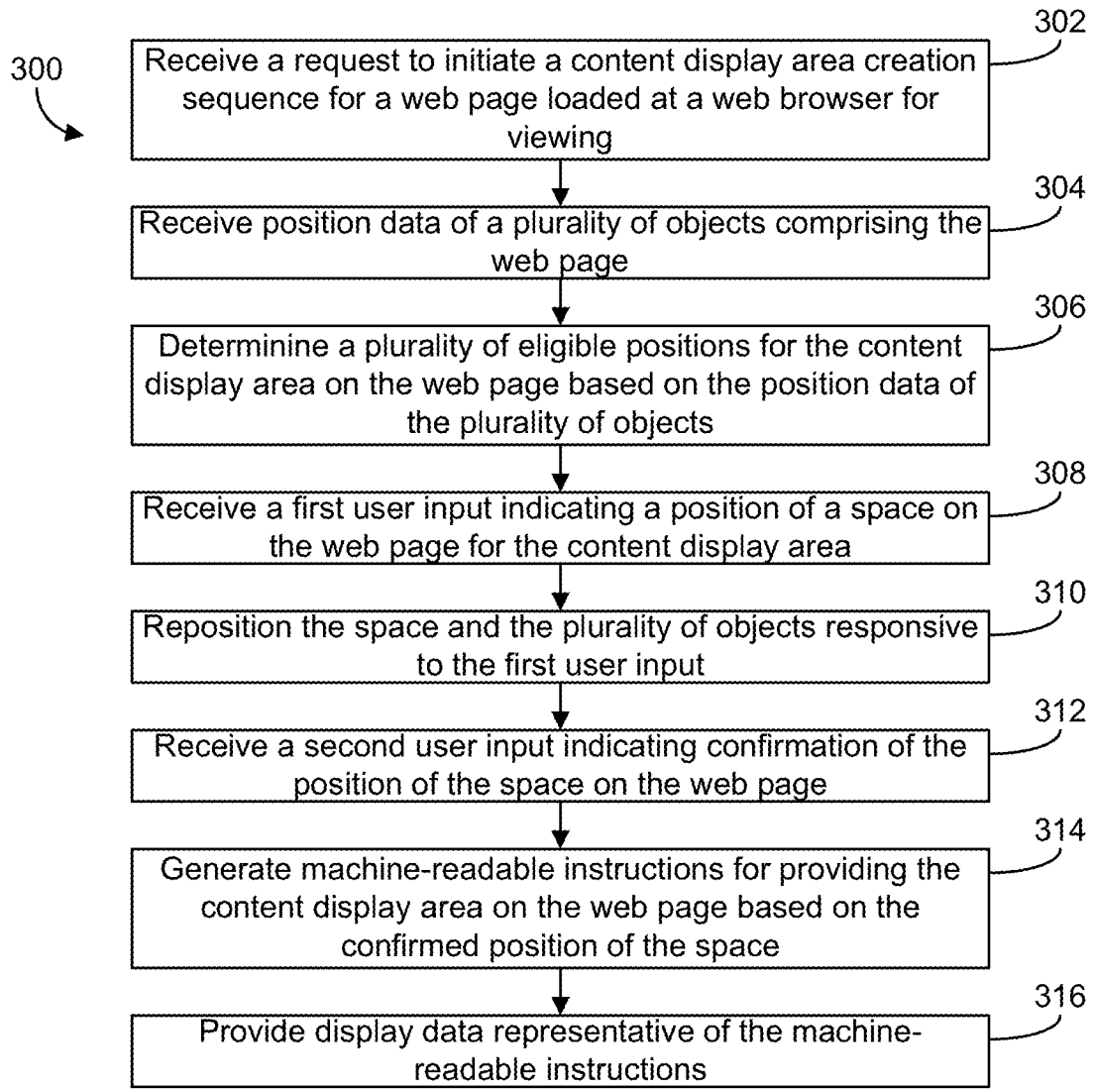
FIG. 3A is a flow diagram of a process for generating a content display area on a web page, according to an illustrative implementation.

Referring to FIG. 3A, a flow diagram of a process 300 for generating a content display area on a web page is shown, according to an illustrative implementation. Process 300 may be implemented by content slot creation server 106. Process 300 is described below in the context of display images of FIGS. 4A-4I, visible to a publisher's agent on web browser via a display device associated with publisher's client device 110. The display images of FIGS. 4A-4I show example web pages with example content.

Figure 4A:
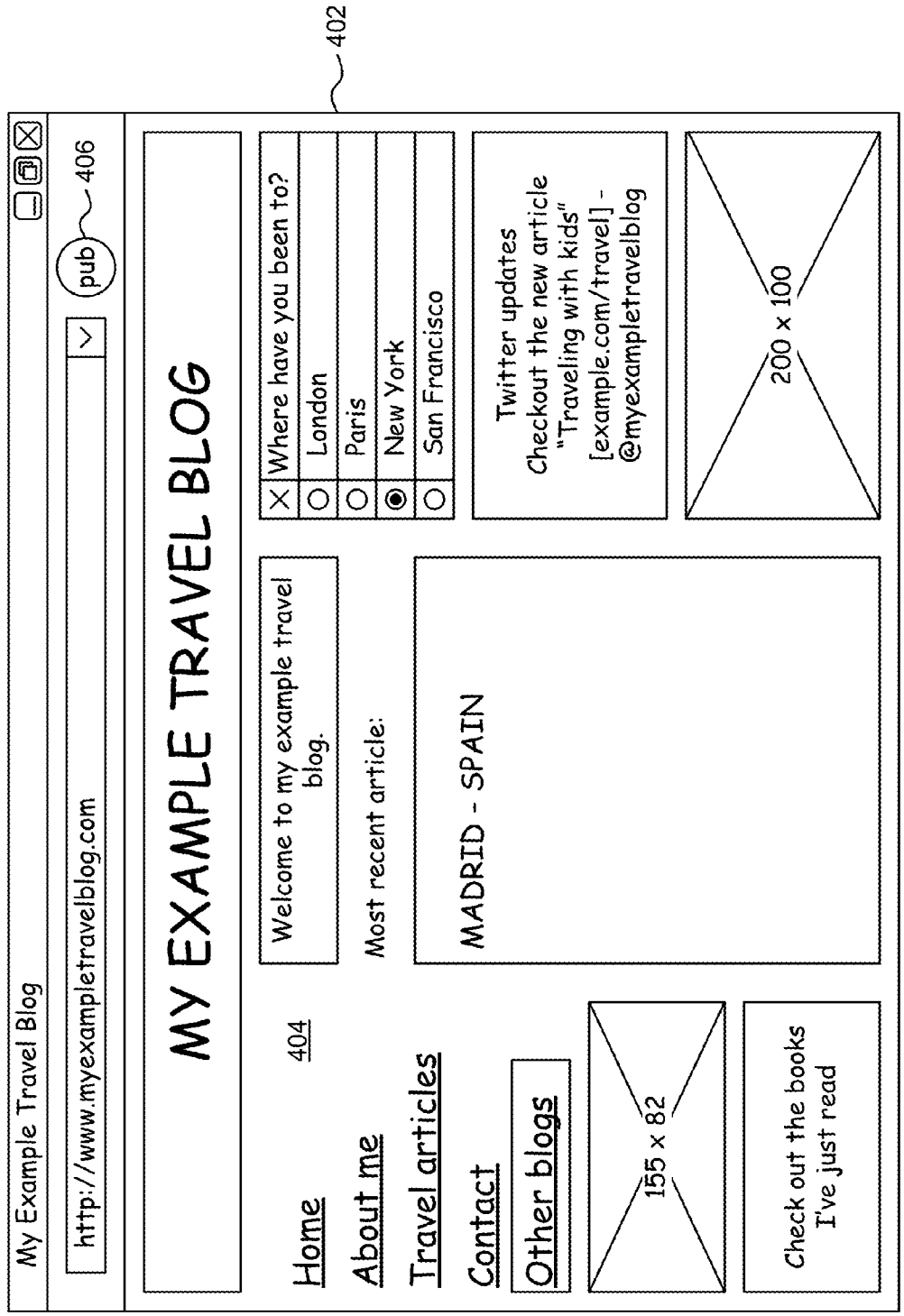
Figure 4B:
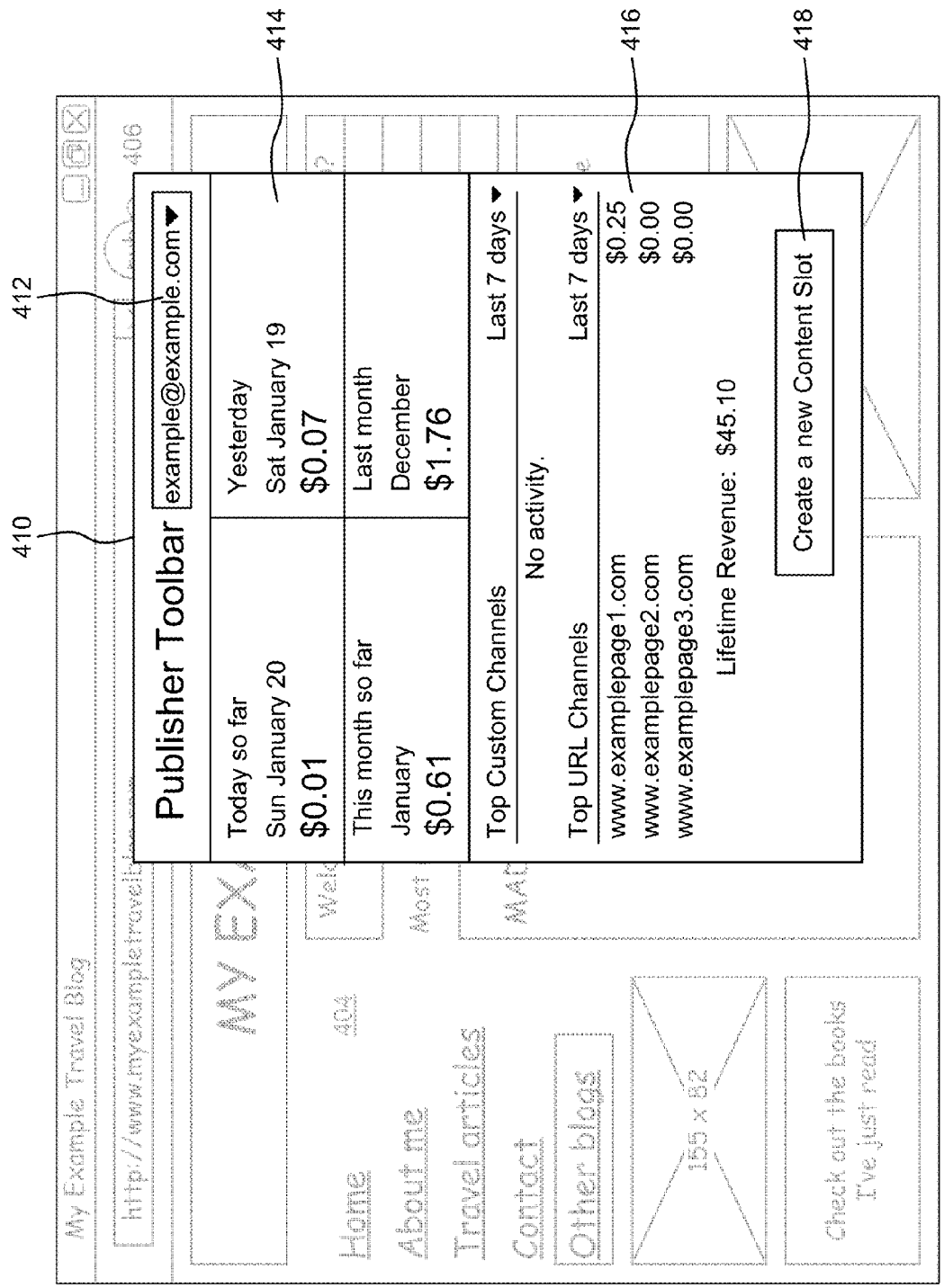

Process 300 includes receiving a request to initiate a content display area creation sequence for a web page loaded at a web browser for viewing (302). The request may be received at content slot creation server 106 from publisher's client device 110. As shown in FIG. 4A, the publisher's agent may be viewing the web page 404 on web browser 402. FIG. 4A shows a web page for a travel blog. Web browser is shown to include a utility 406 for communicating with content slot creation server 106. In the implementation of FIG. 4A, the utility is shown as a web browser toolbar extension. In other implementations, the utility may be implemented differently. For example, in some implementations, the utility may be presented as a web application. The publisher's agent could load a URL in an iframe of the web application. The web application may be configured to overlay the web page associated with the URL with content display area place holders and perform the other processes described herein. In the implementation of FIG. 4A, the publisher's agent may activate the utility by selecting the utility icon 406 (depressing a mouse button, tapping on a touch screen, or any other method of user input). As shown in FIG. 4B, activating the utility may cause web browser 402 to display a pop-up window 410. (In other implementations, the content of window 410 may be shown in a new window, a new tab, etc. of the browser.) According to an illustrative implementation, one or more authentication processes may be provided to ensure that publisher's agent 412 is authorized to modify publisher's web site. For example, publisher's agent may be required to sign in to access publisher toolbar 410. Window 410 may display a variety of statistics, metrics, and/or reports 414, 416 relating to revenue generated for the publisher by pre-existing content display areas on the publisher's web site(s). The publisher's agent may also be able select an option 418 to "Create a new Content Slot" at window 410. In some implementations, selecting utility icon 406 may provide the option 418 to create a new content slot only (and not provide the revenue statistics 414, 416). When the publisher's agent selects option 418, publisher's client device may transmit a request to initiate a content display area creation sequence. The request to initiate the creation sequence may be received at content slot creation server 106. In some implementations, when the create option 418 is selected, the window 410 may disappear and the web page 404 may be dimmed. All of the suggested areas for content display area insertion may be marked with an initial placeholder DIV. This may advantageously aid in visually highlighting the areas where a content slot can be placed, as described below.

Process 300 includes receiving position data of a plurality of objects comprising the web page. The objects can include any block elements, text objects, graphical objects, etc. on the page. For example, links 434, text objects, 424, 428, 430, survey 422, etc. are shown to be elements on web page 404.

Position data may be received at content slot creation server 106. Parser 210 may be configured to access and process the DOM document of web page 404. Parser 210 may retrieve the position data of the plurality of objects on web page 404.

Process 300 includes determining a plurality of eligible positions for the content display area on the web page based on the position data of the plurality of objects (306). Parser 210 may be configured to perform the analysis on the HTML document object model (DOM) of web page 404 in order to identify the most suitable areas where an ad slot can be inserted in the publisher's page. One or more heuristics may be applied to the existing DOM. The heuristics may be implemented in code (example below) and can be applied in conjunction with each other or separately depending on the desired level of accuracy in analysis. Code generator 216 may generate or store code for one or more heuristics. Various implementations may use one or more heuristics described below:

Example 1

Identify all spaces between block elements of tag type "div" that are wider than the minimum content slot width of a plurality of pre-determined content slots. (Examples of pre-determined content slot dimensions are described in the discussion of FIG. 3B.)

Example 2

Identify all spaces after certain block elements (e.g. div, table.) whose first element child is also a block element.

Example 3

Identify all spaces between block elements whose top-left x coordinates are within either the first or the last 30% of the page width of the body element (a geometrical heuristic).

In other implementations, various other heuristics that are extracted from one or more utilities provided to publisher to improve their click through rates (CTR), revenue per thousand impressions (RPM), and/or other metrics by recommending to the publisher the format and dimensions of the content display areas to use and the layout of the content display areas. Example of these other heuristics include:

Example 4

Prefer content slot candidates that are close to the upper left of the web page

Example 5

Prefer content slot candidates that are wide enough to hold a video ad format that has good RPM performance, etc.

According to an illustrative implementation, the heuristic described in example 2, above, may be implemented in JavaScript as follows:

```
// get block elements in a document, which are suitable for adding content slots after.
function getBlockElements ( ) {
var blockElements = [ ];
var blockElementTags = ['div', 'table'];
for (var i=0; i < blockElementTags.length; i++) {
var foundElements = document.getElementsByTagName(blockElementTags[i]);
for (var k=0; k < foundElements.length; k++) {
if (foundElements[k].firstElementChild != null &&
blockElementTags.indexOf(foundElements[k].firstElementChild.tagName.toLowerCase( )) > -1)
```

```
{
blockElements.push(foundElements[k]);
}
}
}
}
return blockElements;
}
```

This implementation will return all the block elements with tagNames DIV, TABLE and only those who also have either a DIV or a TABLE as their first element child. This heuristic in practice would prevent suggesting ad slots inside div elements, which may be showing a piece of content. In some implementations, the number of heuristics could be increased and/or the heuristics could be used together.

In some implementations, process 300 includes modifying the DOM document of web page 404 to include place holders for the eligible content slot positions that have been identified. Code generator 216 may provide the code to modify the DOM document and/or the modified DOM document to publisher 108 and/or publisher's client device 110 to execute. Content slot creation server 106 may provide commands to publisher's client device 110 to reload the web page 404 with the place holders such that publisher's agent may view the place holders on browser 402. According to an illustrative implementation, once the suitable block elements for content slots are determined, the DOM document can be decorated by place holders that are initially not visible to the user. Assuming the getBlockElements returns these block elements, the following code snippet adds the placeholder content slots after them:

```
function createPlaceHolder(i) {
var placeHolder = document.createElement('div');
placeHolder.id = "placeHolderElement" + i;
placeHoder.className = "smallPlaceHolder";
placeHolder.textContent = "This is an AdSlot place holder." ;
container.addEventListener("mouseover", function ( ) {
document.getElementById(id).className = "enlargedPlaceHolder";
}, false);
container.addEventListener("mouseout", function ( ) {
document.getElementById(id).className = "smallPlaceHolder";
}, false)
return placeHolder;
}
function decorate( ) {
var blockElements = getBlockElements( );
for (var element in blockElements) {
var blockElement = blockElements[element];
var container = createPlaceHolder(element);
blockElement.parentNode.insertBefore(container,
blockElement.nextSibling);
}
}
```

Figure 4C:
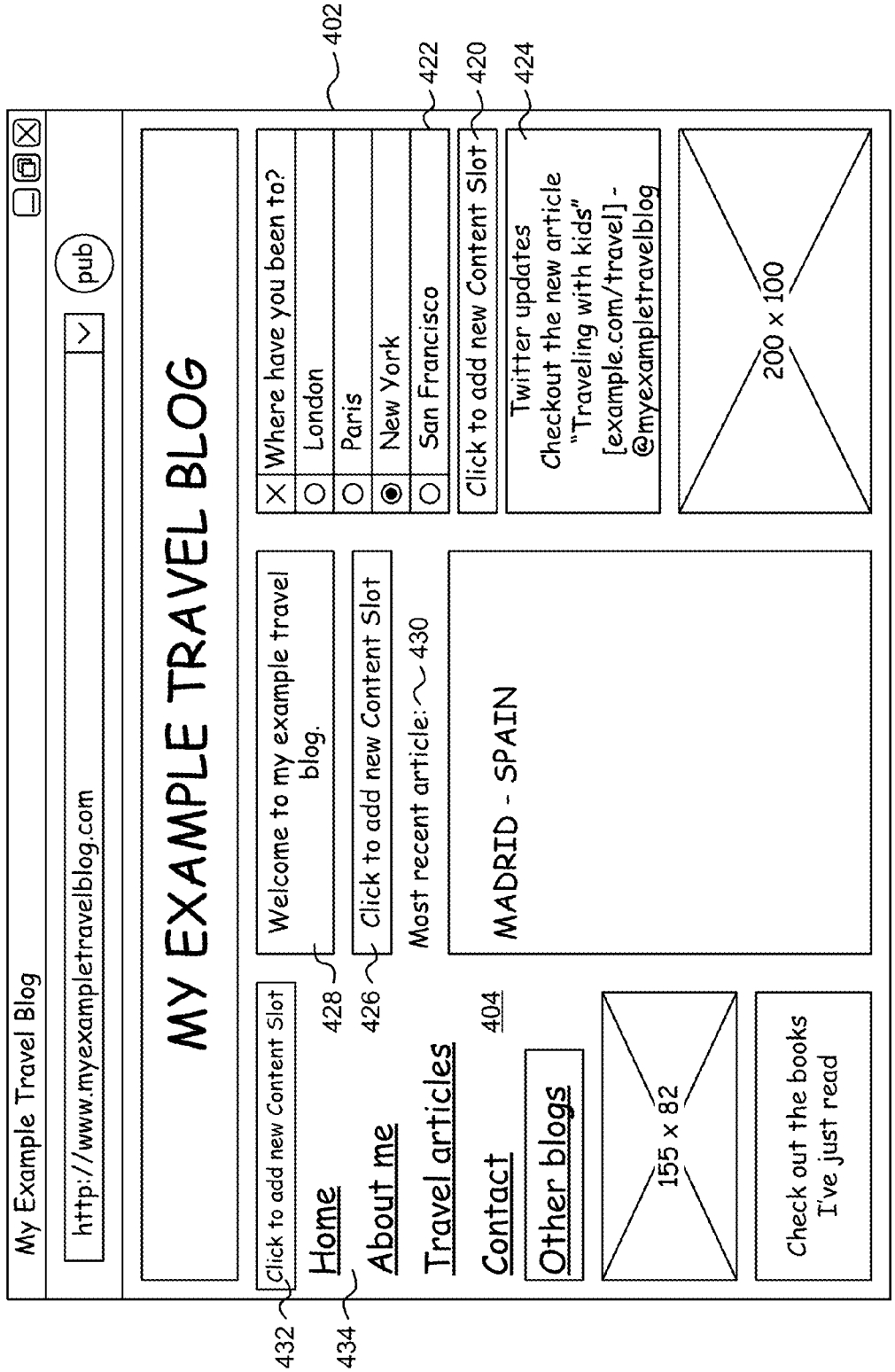

By executing the code above on the currently loaded DOM, the elements after which it is suitable to insert an content slot placeholder are determined, a new content slot element is created, and it is appended after each of the candidate elements. In other implementations, different code may be used to accomplish the same objective. In some implementations, the placeholders are visible to the publisher's agent on a web browser. This is shown in FIG. 4C. FIG. 4C shows eligible content slots 420, 426, and 432 on web browser 402.

Figure 4D:
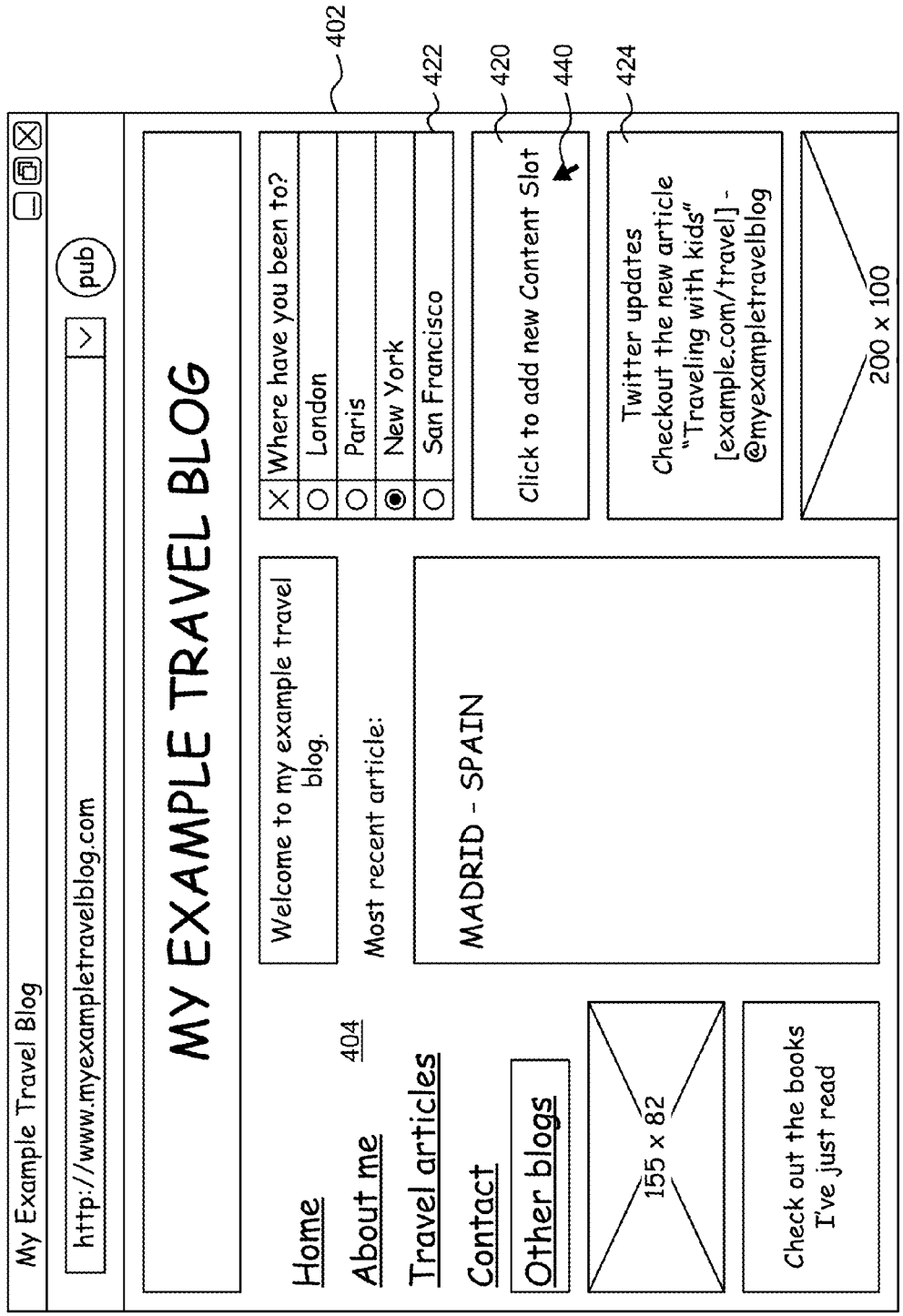
Figure 4E:
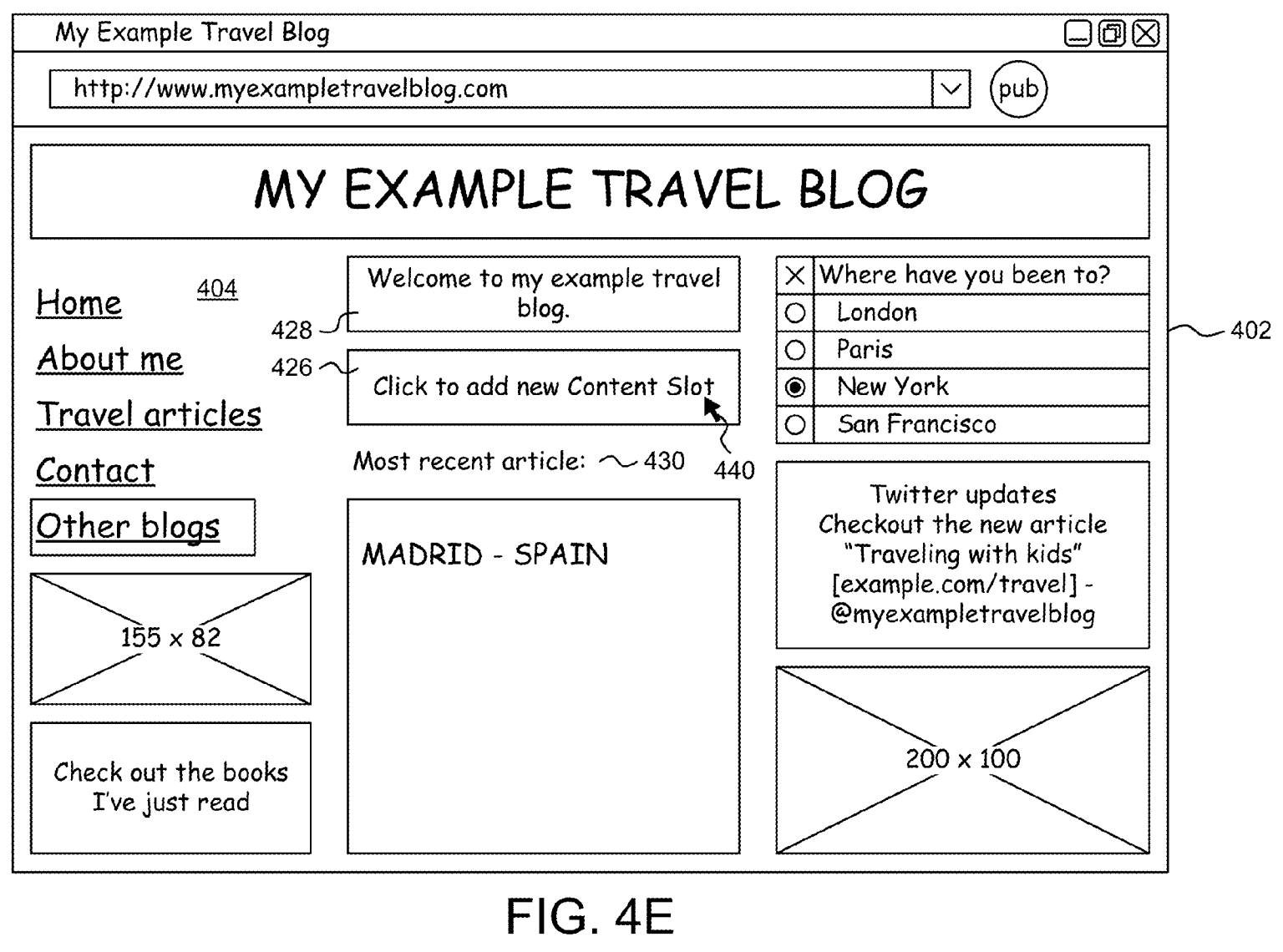
Figure 4F:
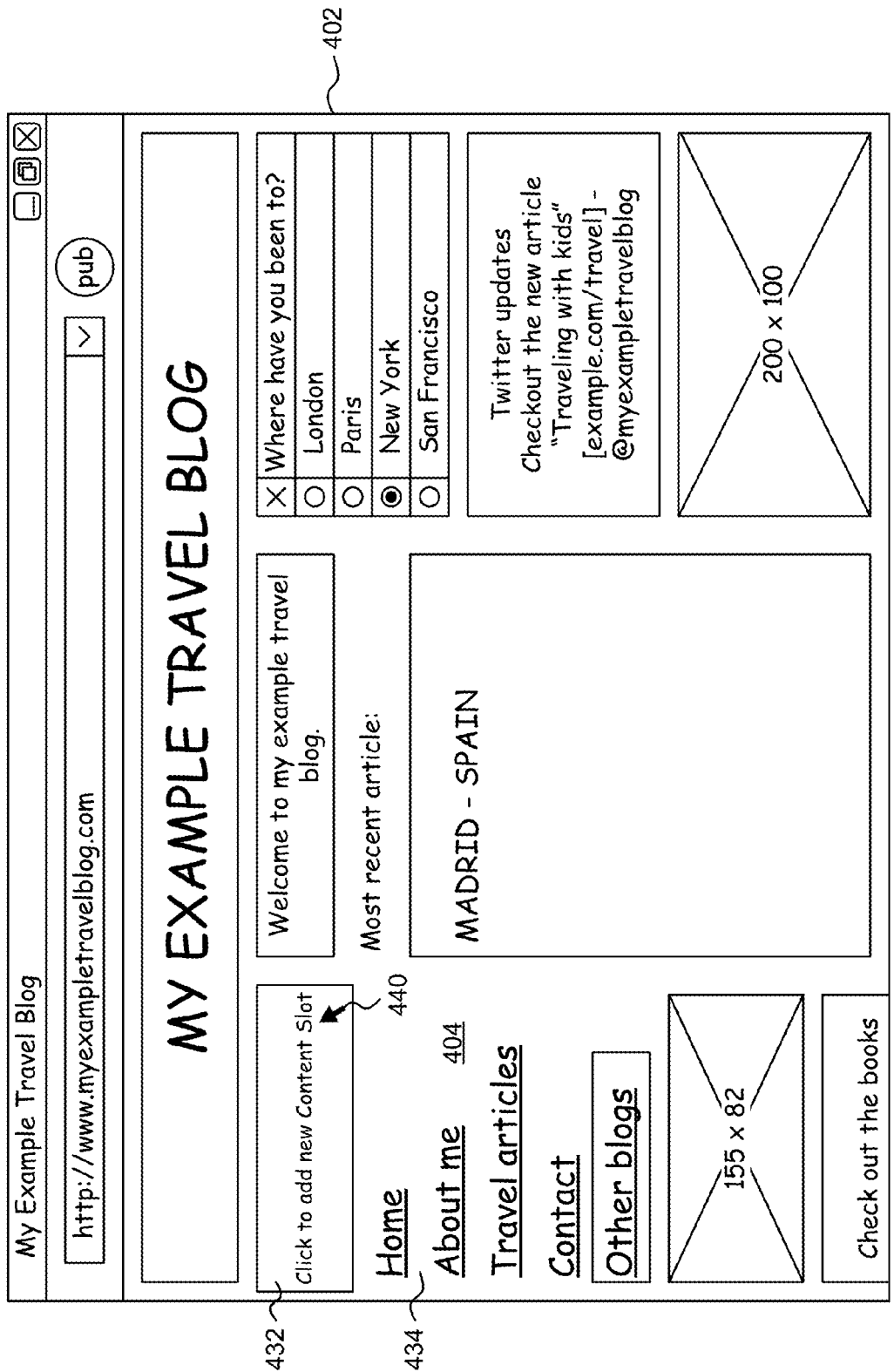

Process 300 includes receiving a first user input indicating a position of a space on the web page for the content display area (308). Process 300 also includes repositioning the space and the plurality of objects on the web page responsive to the first user input. The first user input may be the position of a cursor (e.g., via a mouse, movement of a finger on a touch screen, etc.) associated with publisher's client device 110. For example, when the publisher's agent moves their mouse over one of the suggested content slots, it grows in size, and the other placeholders disappear. The objects on the page that are adjacent to the selected placeholder may also move in response to the user input. Web browser 402 may be automatically and dynamically updated to reflect the DOM document modifications made by content slot creation server 106. Content slot creation server 105 may compute at least one dimension of the space for the content display area based on the position of the space relative to the plurality of objects on the web page. Content slot creation server 106 may modify the space based on the computed dimension. The web browser may load the modified shape and the plurality of objects for viewing. This is shown in FIGS. 4D-4F. In FIG. 4D, the cursor 440 is over content slot 420. Compared to content slot 420 shown in FIG. 4C, content slot 420 in FIG. 4D has grown in size. Content slot 420 of FIG. 4C may have an initial standard height. Content slot 420 may re-adjust its size to the width of the most inner block element that the cursor 440 is positioned over. Objects 422 and/or 424 of web page 404 have also shifted to accommodate the increased size of content slot 420. In some implementations, block elements 422 and/or 424 may move in the direction specified by the floating style attribute of the container. According to an illustrative implementation, when the mouse is moved out of content slot 420, content slot 420 returns to its original size and the other content slots 426, 432 appear again on the web page 404 (as shown in FIG. 4C). In FIG. 4E, the cursor 440 is over content slot 426. Compared to content slot 426 shown in FIG. 4C, content slot 426 in FIG. 4E has grown in size, as described with respect to content slot 420. Objects 428 and/or 430 of web page 404 have also shifted to accommodate the increased size of content slot 426, as described with respect to objects 422, 424. According to an illustrative implementation, when the mouse is moved out of content slot 426, content slot 426 returns to its original size and the other content slots 420, 432 appear again on the web page 404 (as shown in FIG. 4C). In FIG. 4F, the cursor 440 is over content slot 432. Compared to content slot 432 shown in FIG. 4C, content slot 432 in FIG. 4F has grown in size, as described with respect to content slot 420. Objects 434 of web page 404 has also shifted to accommodate the increased size of content slot 426, as described with respect to objects 422, 424. According to an illustrative implementation, when the mouse is moved out of content slot 432, content slot 432 returns to its original size and the other content slots 420, 426 appear again on the web page 404 (as shown in FIG. 4C).

Process 300 includes receiving a second user input indicating confirmation of the position of the space for the content display area on the web page (312). The second user input may be a selection (e.g., click or depression of a mouse button, tap on a touch screen, etc.) of one of the eligible positions 420, 426, 430 identified in step 306. In some implementations, process 300 includes providing display data representative of at least one of a computed dimension of the space for the content display area, a color palette of the space, and a preview of content in the space. This is shown in FIG. 4G. For example, when the publisher's agent clicks on a highlighted content slot box, a preview window 450 is displayed on the web browser 402. Preview window 450 provides a choice of content type 452 (e.g., text-only, text/rich media, rich media only, etc.), the suggested content slot dimensions 454, the suggested color palette 456, a sample of the web page 404 with the content slot 460, and the content slot 460 with a preview of content inside. One implementation of the process for generating the recommended content slot dimensions is described in the discussion of FIG. 3B. One implementation of the process for generating the recommended color palette is described in the discussion of FIGS. 3C-3F. Preview window 450 may provide drop down lists (or another type of selection options) for different content types 452, different content slot dimensions 545 (i.e., dimensions other than the suggested dimensions), and/or different color palettes 456 (i.e., color palette other than the suggested color palette). The different content slot dimensions 545 may include a plurality of pre-determined dimensions. The different color palettes may include a pre-determined, default color palette, other pre-determined color palette, and/or options for the publisher's agent to create a custom palette. In some implementations, preview window 450 may provide a link to a web application for specifying additional attributes of the content display area.

Figure 4G:
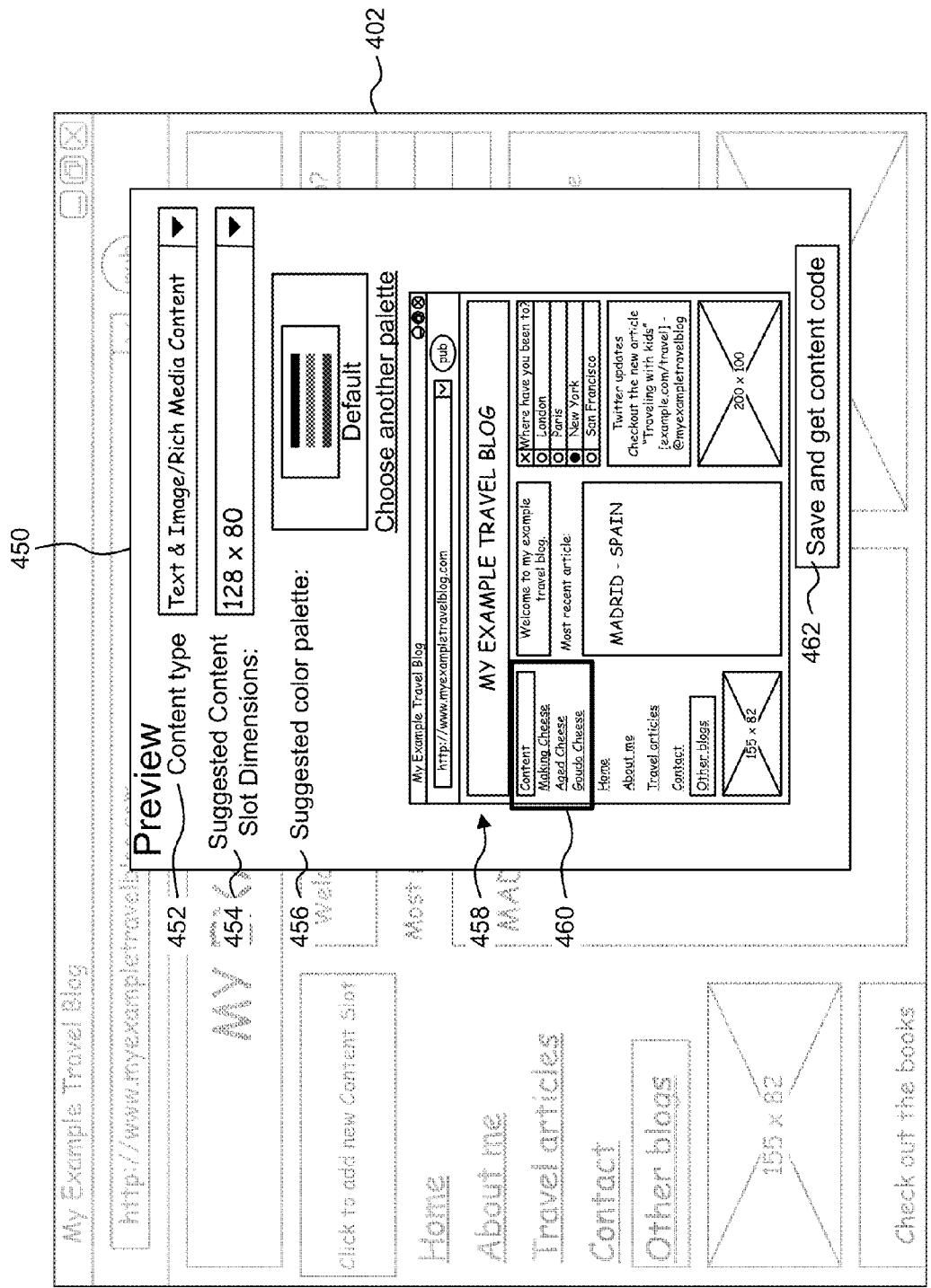
Figure 4H:
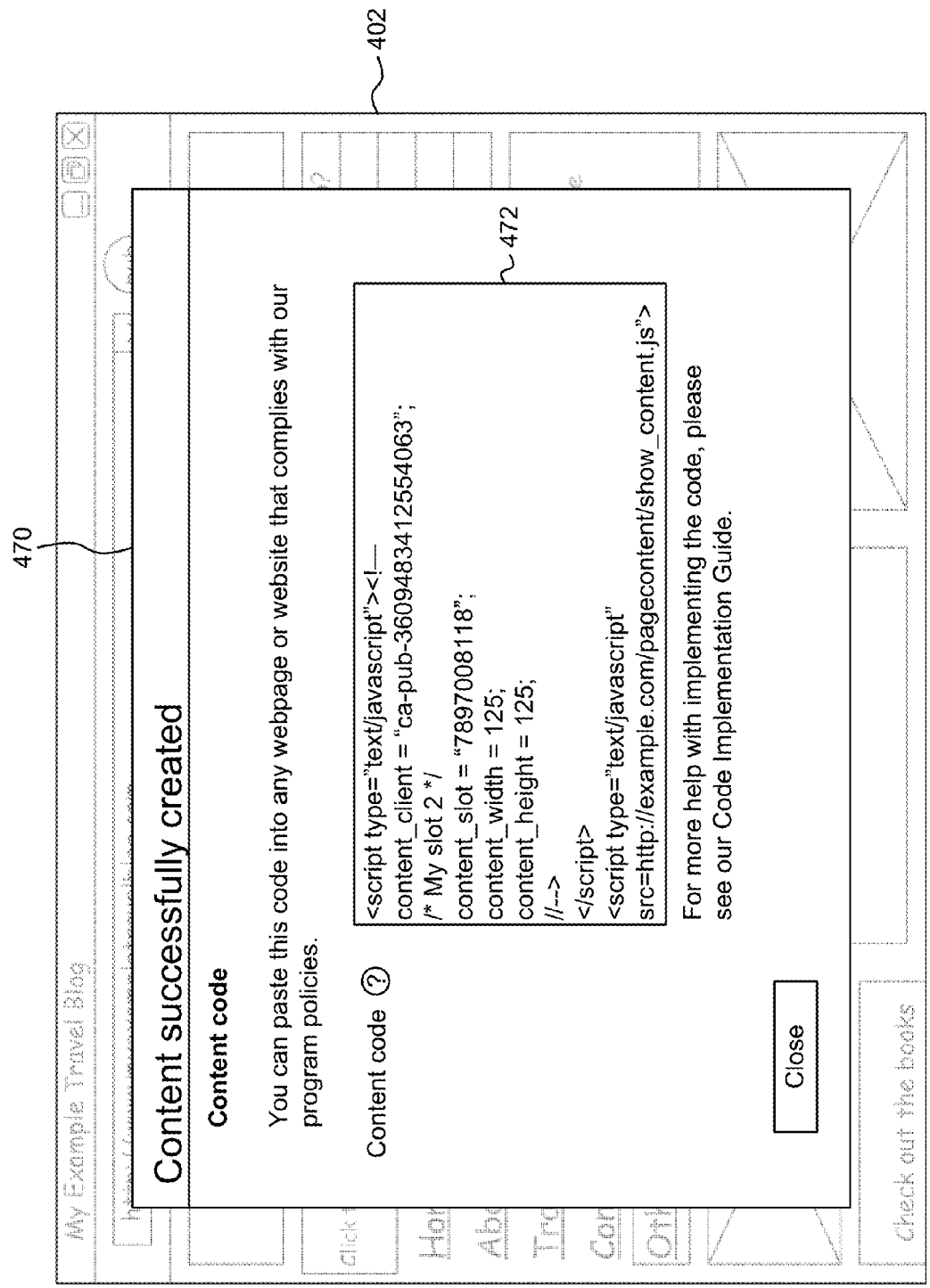
Figure 4I:
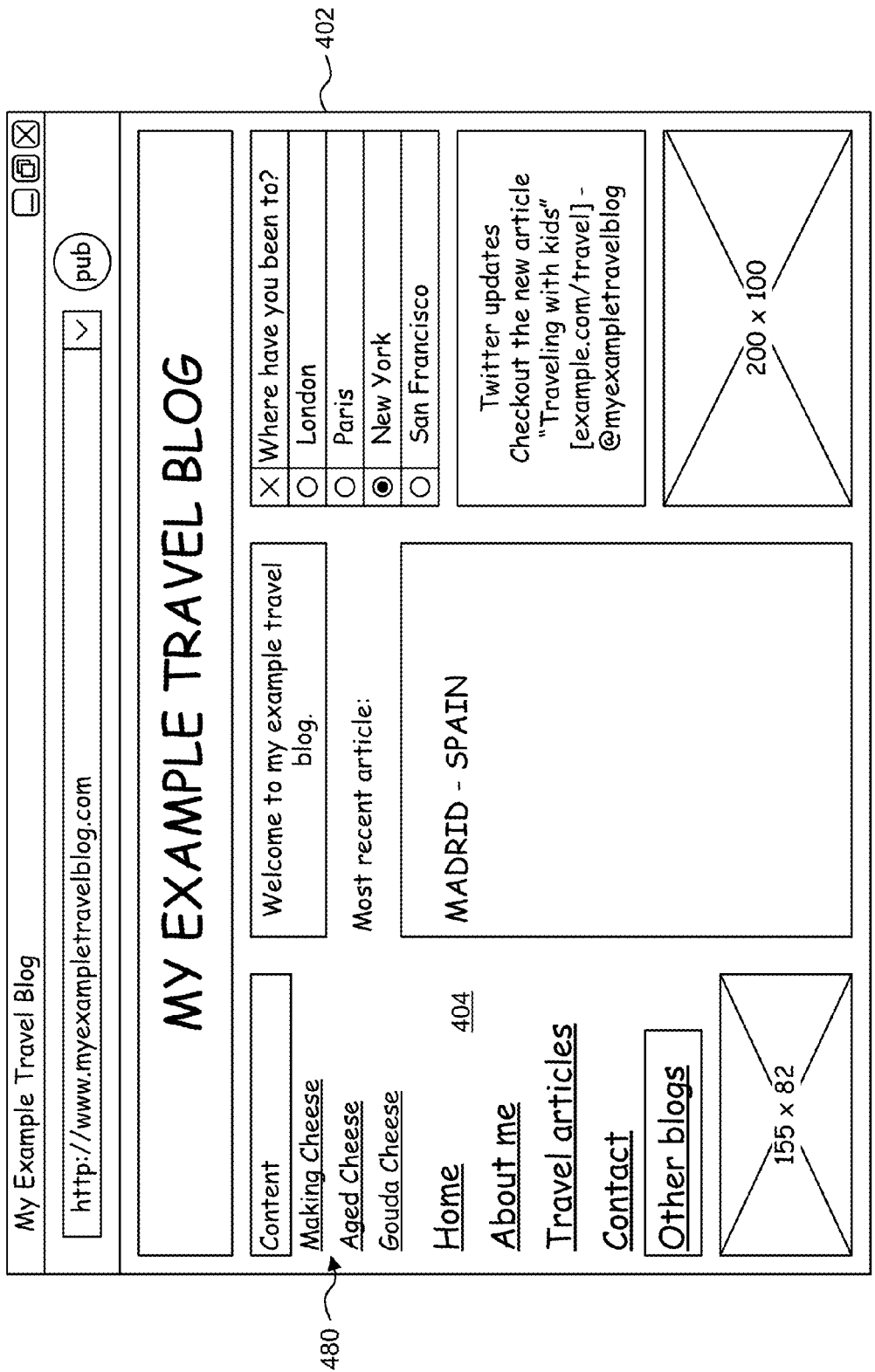

In some implementations, process 300 includes receiving a third user input indicating a request to generate the machine-readable instructions. For example, when the publisher's agent is satisfied with the layout and color options of their new content slot, they can click on the option 462 (FIG. 4G) with the caption "save and get content code." Process 300 includes generating machine-readable instructions (or content code) for providing the content display area on the web page based on the confirmed position of the space (314). Machine-readable instructions may be generated at content slot creation server 106 (e.g., code generator 216). For example, a portion of JavaScript code (or instructions any other machine-readable language), indicating the position of the content display area, dimensions, color palette, and/or other attributes, may be generated. The content code may also instructions to pull or receive content from content server 104. Process 300 includes providing display data representative of the machine-readable instructions (316). This is shown in FIG. 4H. The display data may cause a display device associated with publisher's client device to open a pop-up window 470 (e.g., at web browser 402). Window 470 may display the content code generated for the content display area. The publisher's agent may copy and paste the machine-readable instructions into their web site's source code. Once the publisher's agent adds the content code into their web site's source code and re-publishes their web site, content may be served from content server 104 to the content slot. This is shown in FIG. 4I. Web browser 402 is shown to have the content for web page 404 (e.g., from publisher 108) downloaded. Web page 404 includes content display area 480 with content from, e.g., content server 104. The content in content display area 480 includes three hyperlinks related to cheese ("making cheese," "aged cheese," and "Gouda cheese").

Figure 3B:
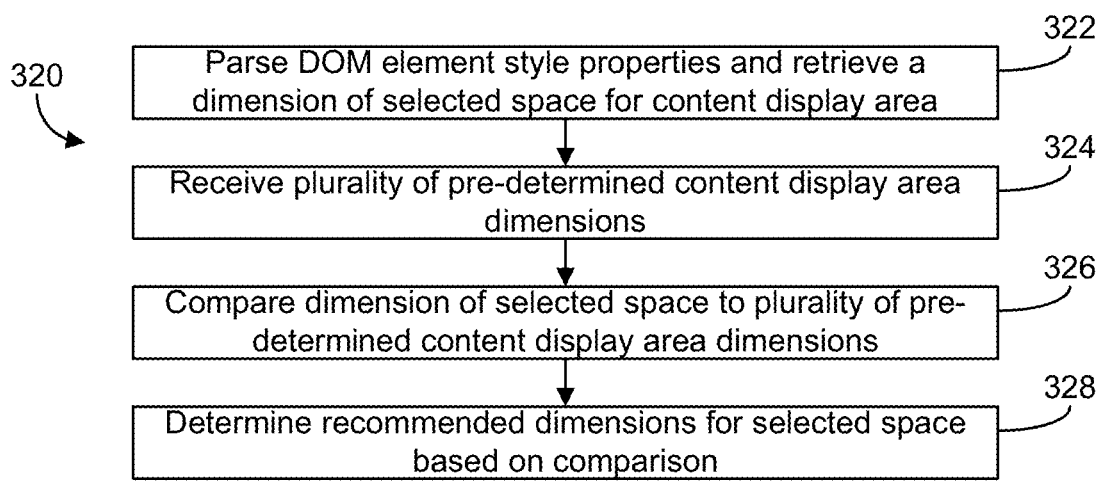
FIG. 3B is a flow diagram of a process for determining recommended dimensions for a content display area, according to an illustrative implementation.
Figure 3C:
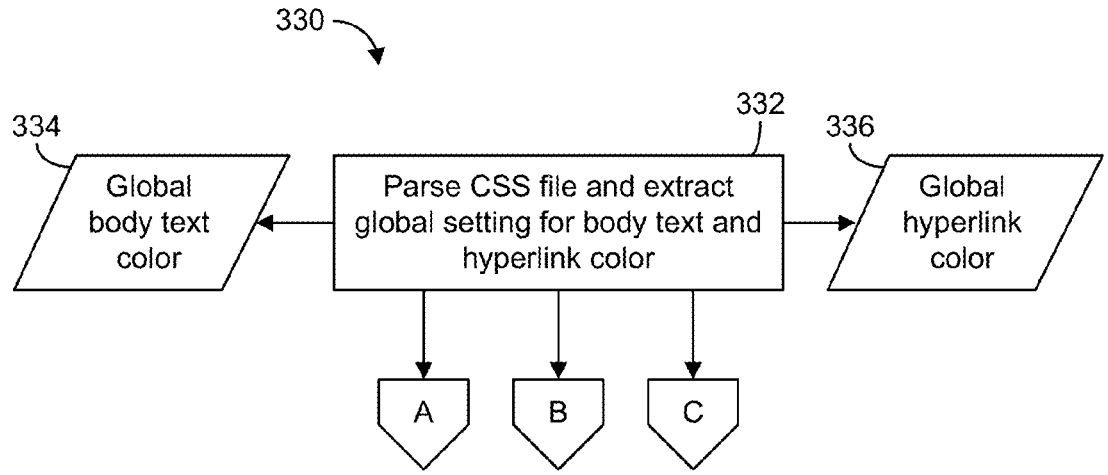
FIGS. 3C-3F are flow diagrams of processes for determining a color palette for a content display area, according to illustrative implementations.
Figure 3D:
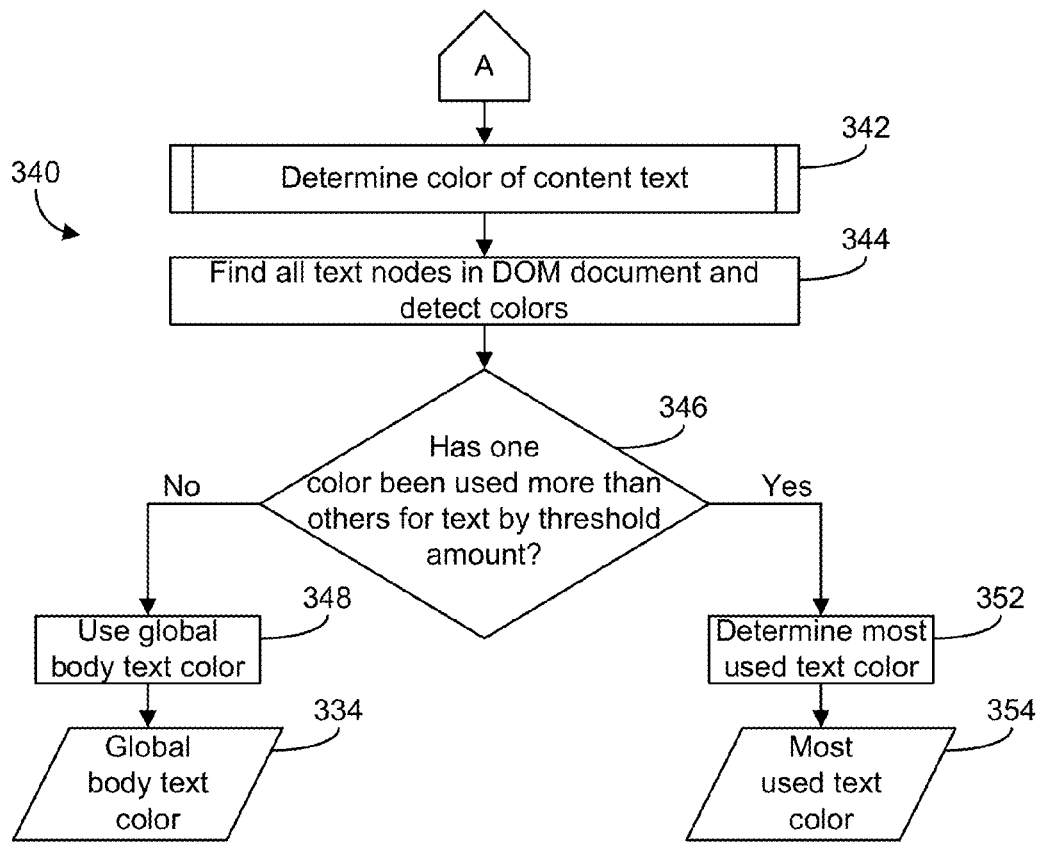
Figure 3E:
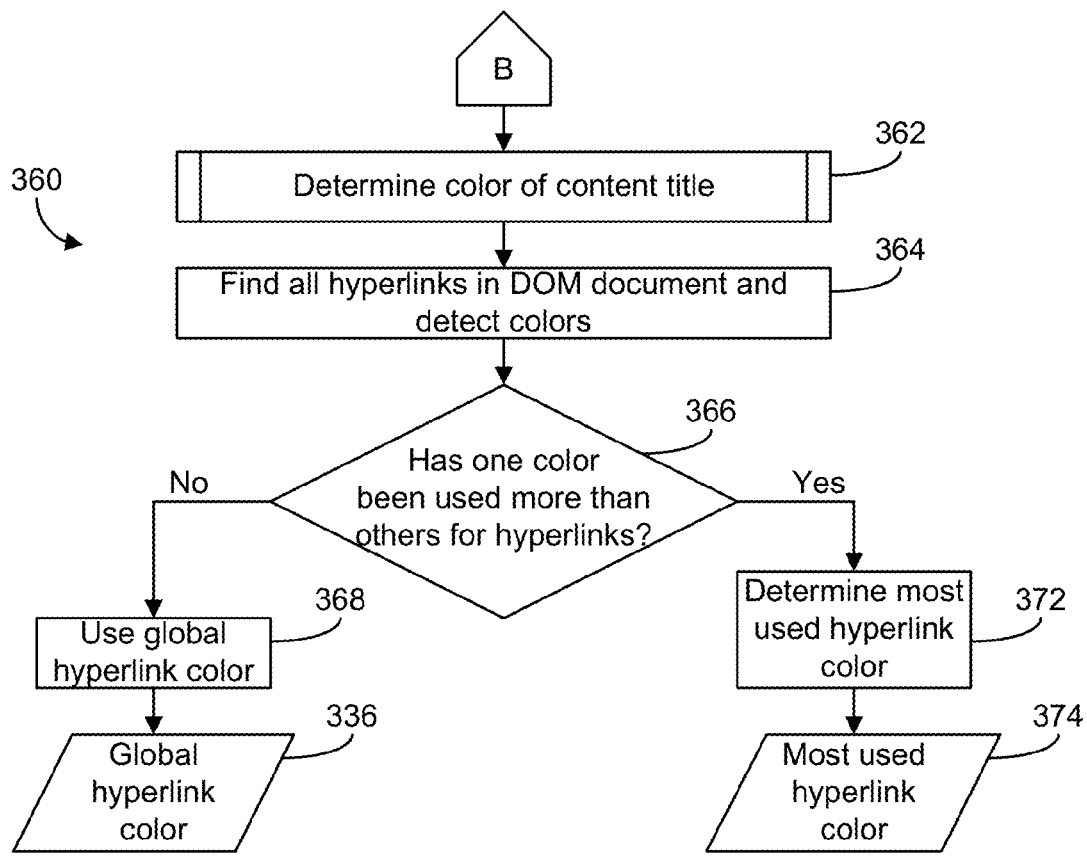
Figure 3F:
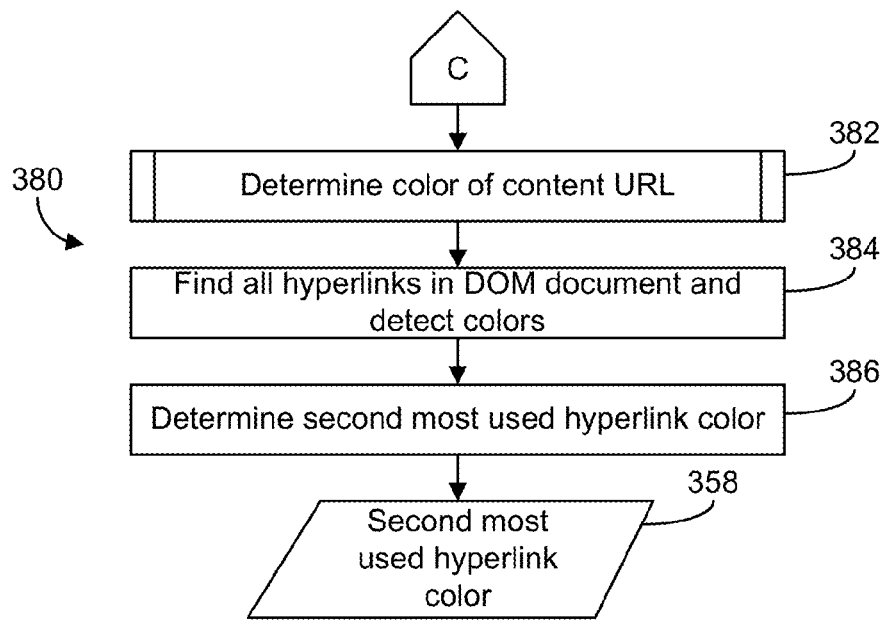

Referring to FIG. 3B, a flow diagram of a process 320 for determining recommended dimensions for a content display area is shown, according to an illustrative implementation. Process 320 may be carried about by content slot creation server 106 (e.g., dimension calculator 210). According to an illustrative implementation, the dimension recommendation can be done by calculating the maximum available width and height for the new content slot denoted by the selected content slot (e.g., the content slot selected in step 312 of process 300) and matching the maximum dimension with a plurality of pre-determined content slot dimensions. Process 320 includes parsing the HTML DOM element style properties and retrieving a dimension (e.g., width) of the selected space for the content display area (322). The property retrieved may be, e.g., element.style.width. Process 320 includes receiving a plurality of pre-determined content display areas dimensions (324). The pre-determined content display area dimensions may include dimensions selected by a content organizer responsible for providing content to users' client devices 112 from content server 104. The pre-determined content display area dimensions may be retrieved from a relational database (e.g., a MySQL database). These dimensions may include, e.g., Leaderboard (728×90), Banner (468×60), Skyscraper (120×600), Wide Skyscraper (160×600), Large Skyscraper (300×600), Medium Rectangle (300×250), Large Rectangle (336×280), Square (250×250), and Small Square (200×200). In various implementations, more, fewer, and/or other dimensions and/or shapes may be used. Process 320 includes comparing the dimension of the selected space (from step 322) to the plurality of pre-determined content display area dimensions (326). Comparing may include determining which pre-determined dimensions are closest to the dimension determined in step 322. Process 300 includes determining the recommended dimension for the selected spaced based on the comparison (328). The recommended dimension may be one of the plurality of predetermined dimensions that optimally matches the maximum dimension (from step 322). The recommended dimensions may be provided to the publisher's agent at suggested content slot dimensions 454 of preview window 450 (FIG. 4G). A content display area with the recommended dimensions may also be shown in the preview 460. A publisher's agent may choose to utilize the recommended dimensions or may choose other dimensions provided in the list 454. Machine-readable instructions may be generated (e.g., step 314 of process 300) based on either the recommended dimensions or the agent's chosen dimensions. In other implementations, the recommended dimensions may be used when the publisher's agent moves the cursor over one of the eligible content slot positions (as shown in, e.g., FIGS. 4D-4F). For example, the content slot positions 420, 426, 432 may increase in size to the recommended size computed by content slot creation server 106 (as described in the discussion of process 300.

Referring to FIGS. 3C-3F, flow diagrams of processes for determining a color palette for a content display area are shown, according to illustrative implementations. In various implementations, a color palette may include one or more colors. In FIGS. 3C-3F, processes for selecting three colors are described (one color each for the content title, content text, and content URL). According to an illustrative implementation, the color palette may be used for text content display in the content display area. In other implementations, a color palette with one or more colors may be utilized for content display areas with other types of content (graphics, rich media, etc.). The processes of FIGS. 3C-3F may be carried out by content slot creation server 106 (e.g., parser 210, color palette calculator 214). The color palette can be computed using an algorithm designed to evaluate each color dominantly used in the web site's textual content. If this fails, a pre-determined, default color palette can be suggested.

Process 300 (FIG. 3C) includes parsing the CSS file and extracting the global setting for the body text color 334 and hyperlink color 336 (332). Process 300 continues with processes 340, 360, and 380, for determining the content text color, content title color, and content URL color, respectively.

Process 340 (FIG. 3D) includes a sub process for determining color of the content text (342). Process 340 includes finding all text nodes in the DOM document of the web page and detecting the colors used (344). Process 340 includes determining if one color has been used more than others for text (346). In some implementations, process 340 determines if one color has been used more than others by a threshold amount. The threshold amount may be a pre-determined amount specified to identify a dominantly used color. If no color has been used more than others, the global body text color 334 may be used for the content text color (348). If a color has been used more than others, process 340 includes determining the most used text color (352). The most used text color 354 may be used for the content text color.

Process 360 (FIG. 3E) includes a sub process for determining color of the content title (362). Process 360 includes finding all hyperlinks in the DOM document and detecting the colors used (344). Process 360 includes determining if one color has been used more than others for hyperlinks (366). In some implementations, process 360 determines if one color has been used more than others by a threshold amount. The threshold amount may be a pre-determined amount specified to identify a dominantly used color. The threshold amount for process 360 may be the same or different from the threshold amount for process 340. If no color has been used more than others, the global hyperlink color 336 may be used for the content title color (368). If a color has been used more than others, process 360 includes determining the most used hyperlink color (372). The most used hyperlink color 374 may be used for the content hyperlink color.

Process 360 (FIG. 3E) includes a sub process for determining color of the content URL (382). Process 360 includes finding all hyperlinks in the DOM document and detecting the colors used (384). Process 380 includes determining the second most used hyperlink color (386). The second most used hyperlink color 358 may be used for the content URL color.

According an illustrative implementation, if any, all, or some portion of the steps described in the discussions of FIGS. 3C-3F fail to determine a dominantly used color, a pre-determined, default color palette may be suggested to the publisher's agent. The recommended color palette may be provided to the publisher's agent at suggested color palette 456 of preview window 450 (FIG. 4G). A content display area with the recommended color palette may also be shown in the preview 460. A publisher's agent may choose to utilize the recommended color palette, choose other color palettes provided in the list 456, or create a custom color palette via, e.g., a GUI provided in list 456. Machine-readable instructions may be generated (e.g., step 314 of process 300) based on either the recommended color palette or the agent's chosen color palette.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "client or "server" includes all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos, and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels," etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method of generating a content display area on a web page, the method comprising:
    receiving, by a computer server, a first request to insert a content slot in a web page loaded at a web browser for viewing on a client device;
    retrieving, by the computer server from a document object model (DOM) document of the web page, position data of a plurality of objects within the web page;
    determining, by the computer server, a plurality of eligible content slot positions on the web page based on the position data of the plurality of objects;
    modifying, by the computer server, the DOM document to insert a plurality of placeholders, each placeholder corresponding to a respective one of the plurality of eligible content slot positions within the webpage and including a respective selectable actionable item, which when selected, causes the client device to transmit a second request to the computer server to insert a content slot at the content slot position corresponding to that placeholder;
    displaying, via the browser, a version of the web page corresponding to the modified DOM document, the version of the webpage including the plurality of placeholders;
    receiving, by the computer server from the client device, responsive to a first user input indicative of a selection of an actionable item of a first placeholder of the plurality of placeholders, a third request to insert a first content slot at a first content slot position corresponding to the first placeholder;
    responsive to receiving the third request, computing, by the computer server, at least one dimension of the first placeholder based on the first content slot position relative to positions of the plurality of objects;
    modifying, by the computer server, the DOM documents to i) adjust the size of the first placeholder using the at least one dimension computed and to ii) remove the remaining inserted placeholders for other eligible content slot positions, the web browser loading the first placeholder with the respective size adjusted and the plurality of objects for viewing;
    receiving, by the computer server, a second user input indicating confirmation of the first content slot position on the web page;
    generating, by the computer server, machine-readable instructions for inserting the first content slot at the first content slot position corresponding to the first placeholder on the web page based on the confirmation, the first content slot having a dimension corresponding to the at least one dimension computed; and
    providing, by the computer server, display data representative of the machine-readable instructions.

2. The method of claim 1, further comprising:
    repositioning the first placeholder responsive to receiving the third request.

3. The method of claim 1, wherein computing at least one dimension of the first placeholder comprises:
    determining maximum dimension of a block element associated with the web page;
    comparing the maximum dimension to a plurality of predetermined dimensions;
    selecting one of the plurality of predetermined dimensions that matches the maximum dimension.

4. The method of claim 1, further comprising:
    computing at least one style attribute for content associated with the first content slot position.

5. The method of claim 4, wherein the at least one style attribute comprises a color palette.

6. The method of claim 5, wherein computing the at least one style attribute comprises:
    determining a plurality of colors displayed on the web page;
    determining a most used color on the web page from the plurality of colors; and
    selecting the most used color for the selected content slot position.

7. The method of claim 1, further comprising:
    providing display data representative of at least one of a computer dimension of the first content slot position, a color palette of the first content slot position, and a preview of content in the first content slot position; and
    receiving a third user input indicating a request to generate the machine-readable instructions.

8. A system for generating a content display area on a web page comprising a processing circuit configured to:
    receive a first request to insert a content slot in a web page loaded at a web browser for viewing on a client device;
    retrieve, from a document object model (DOM) document of the web page, position data of a plurality of objects within the web page;
    determining a plurality of eligible content slot positions on the web page based on the position data of the plurality of objects;
    modify the DOM document to insert a plurality of placeholders, each placeholder corresponding to a respective one of the plurality of eligible content slot positions within the webpage and including a respective selectable actionable item, which when selected, causes the client device to transmit a second request to the computer server to insert a content slot at the content slot position corresponding to that placeholder;
    display, via the browser, a version of the web page corresponding to the modified DOM document, the version of the webpage including the plurality of placeholders;
    receive, from the client device, responsive to a first user input indicative of a selection of an actionable item of a first placeholder of the plurality of placeholders, a third request to insert a first content slot at a first content slot position corresponding to the first placeholder;
    responsive to receiving the third request, compute at least one dimension of the first placeholder based on the first content slot position relative to positions of the plurality of objects;

modify the DOM document to i) adjust the size of the first placeholder using the at least one dimension computer and to ii) remove the remaining inserted placeholders for other eligible content slot positions, the web browser loading the first placeholder with the respective size adjusted and the plurality of objects for viewing;

receive a second user input indicating confirmation of the first content slot position on the web page;

generate machine-readable instructions for inserting the first content slot at the first content slot position corresponding to the first placeholder on the web page based on the confirmation, the first content slot having a dimension corresponding to the at least one dimension computed; and provide display data representative of the machine-readable instructions.

9. The system of claim 8, wherein the processing circuit is further configured to:
reposition the first placeholder responsive to the third request.

10. The system of claim 8, wherein computing at least one dimension of the first placeholder comprises:
determining a maximum dimension of a block element associated with the web page;
comparing the maximum dimension to a plurality of predetermined dimensions;
selecting one of the plurality of predetermined dimensions that optimally matches the maximum dimension.

11. The system of claim 8, wherein the processing circuit is further configured to:
compute at least one style attribute for content associated with the first content slot position.

12. The system of claim 11, wherein the at least one style attribute comprises a color palette.

13. The system of claim 11, wherein computing the at least one style attribute comprises:
determining a plurality of colors displayed on the web page;
determining a most used color on the web page from the plurality of colors; and
selecting the most used color for the selected content slot position.

14. The system of claim 8, wherein the processing circuit is further configured to:
provide display data representative of at least one of the computed dimension of the first content slot position, a color palette of the first content slot position, and a preview of content in the first content slot position; and
receive a third user input indicating a request to generate the machine-readable instructions.

15. A tangible computer-readable storage medium having instructions stored thereon that, when executed by a computing device, cause the computing device to perform operations comprising:
receive a first request to insert a content slot in a web page loaded at a web browser for viewing on a client device;
retrieving, from a document object model (DOM) document of the web page, position data of a plurality of objects within the web page;
determining a plurality of eligible content slot positions the web page based on the position data of the plurality of objects;
modifying the DOM document to insert a plurality of placeholders, each placeholder corresponding to a respective one of the plurality of eligible content slot positions within the webpage and including a respective selectable actionable item, which when selected, causes the client device to transmit a second request to the computer server to insert a content slot at the content slot position corresponding to that placeholder;
displaying, via the browser, a version of the web page corresponding to the modified DOM document, the version of the webpage including the plurality of placeholders;
receiving, from the client device, responsive to a first user input indicative of a selection of an actionable item of a first placeholder of the plurality of placeholders, a third request to insert a first content slot at a first content slot position corresponding to the first placeholder;
responsive to receiving the third request, computing at least one dimension of the first placeholder based on the first content slot position relative to positions of the plurality of objects;
modifying the DOM documents to i) adjust the size of the first placeholder using the at least one dimension computed and to ii) remove the remaining inserted placeholders for other eligible content slot positions, the web browser loading the first placeholder with the respective size adjusted and the plurality of objects for viewing;
receiving a second user input indicating confirmation of the first content slot position on the web page;
generating machine-readable instructions for inserting the first content slot at the first content slot position corresponding to the first placeholder on the web page based on the confirmation, the first content slot having a dimension corresponding to the at least one dimension computed; and
providing display data representative of the machine-readable instructions.

16. The tangible computer-readable storage medium of claim 15, wherein the instructions further comprise:
repositioning the first placeholder responsive to receiving the third request.

17. The tangible computer-readable storage medium of claim 15, wherein computing at least one dimension of the first placeholder comprises:
determining a maximum dimension of a block element associated with the web page;
comparing the maximum dimension to a plurality of predetermined dimensions;
selecting one of the plurality of predetermined dimensions that optimally matches the maximum dimension.

18. The tangible computer-readable storage medium of claim 15, wherein the instructions further comprise:
computing a color palette for content associated with the first content slot position.

19. The tangible computer-readable storage medium of claim 18, wherein computing the color palette comprises:
determining a plurality of colors displayed on the web page;
determining a most used color on the web page from the plurality of colors; and
selected the most user color for the selected content slot position.

20. The tangible computer-readable storage medium of claim 15, wherein the instructions further comprise:
providing display representative of at least one of a computed dimension of the first content slot position, a color palette of the first content slot position, and a preview of content in the first content slot position; and receiving a third user input indicating a request to generate the machine-readable instructions.

\* \* \* \* \*